United States Patent [19]

Hup et al.

[11] Patent Number: 5,360,055
[45] Date of Patent: Nov. 1, 1994

[54] METHOD AND APPARATUS FOR HEAT TREATING A FLUID PRODUCT

[75] Inventors: Gerhard Hup, Leeuwarden; Warmold Huizing, Asserstraat, both of Netherlands

[73] Assignee: Friesland(Frico Domo) Cooperatie B.A., Leeuwarden, Netherlands

[21] Appl. No.: 14,660

[22] Filed: Feb. 8, 1993

[30] Foreign Application Priority Data

Feb. 7, 1992 [NL] Netherlands .................. 9200235

[51] Int. Cl.⁵ .................. A23C 3/033; F28F 27/00; A23L 3/22; A23L 2/16
[52] U.S. Cl. .................. 165/2; 165/66; 99/468; 99/470; 426/521; 426/522
[58] Field of Search .............. 165/2, 66; 99/468, 470; 426/521, 522

[56] References Cited

U.S. PATENT DOCUMENTS

| | | |
|---|---|---|
| 2,197,118 | 4/1940 | Astle . |
| 3,016,815 | 1/1962 | Hanrahan .................. 99/468 |
| 4,636,366 | 1/1987 | Langen .................. 99/483 |
| 5,054,385 | 10/1991 | Scheel et al. .................. 99/483 |

FOREIGN PATENT DOCUMENTS

| | | |
|---|---|---|
| 1001943 | 4/1990 | Belgium . |
| 770064 | 9/1934 | France . |
| 2932494 | 4/1980 | Germany .................. 99/470 |
| 3119632 | 12/1982 | Germany .................. 99/470 |
| 4025570 | 10/1991 | Germany .................. 99/468 |
| 3-80066 | 4/1991 | Japan .................. 99/468 |

*Primary Examiner*—John K. Ford
*Attorney, Agent, or Firm*—Michael N. Meller

[57] ABSTRACT

Method and apparatus for heat treating a fluid product, in which the product is preheated in a countercurrent heat exchange process and heated to the desired treatment temperature in a throughflow heat exchange process, wherein in the primary countercurrent heat exchanger section, a higher pressure than the atmospheric pressure prevails, and both in normal operation and during recirculation through the final-temperature heating section, the secondary countercurrent heat exchange section is maintained at a higher pressure than the pressure in the primary countercurrent heat exchanger section, whilst, should the pressure difference between the primary and the secondary countercurrent heat exchanger sections drop out, the supply and discharge of the product are stopped and the product to be treated is recirculated through the final-temperature heating section.

7 Claims, 1 Drawing Sheet

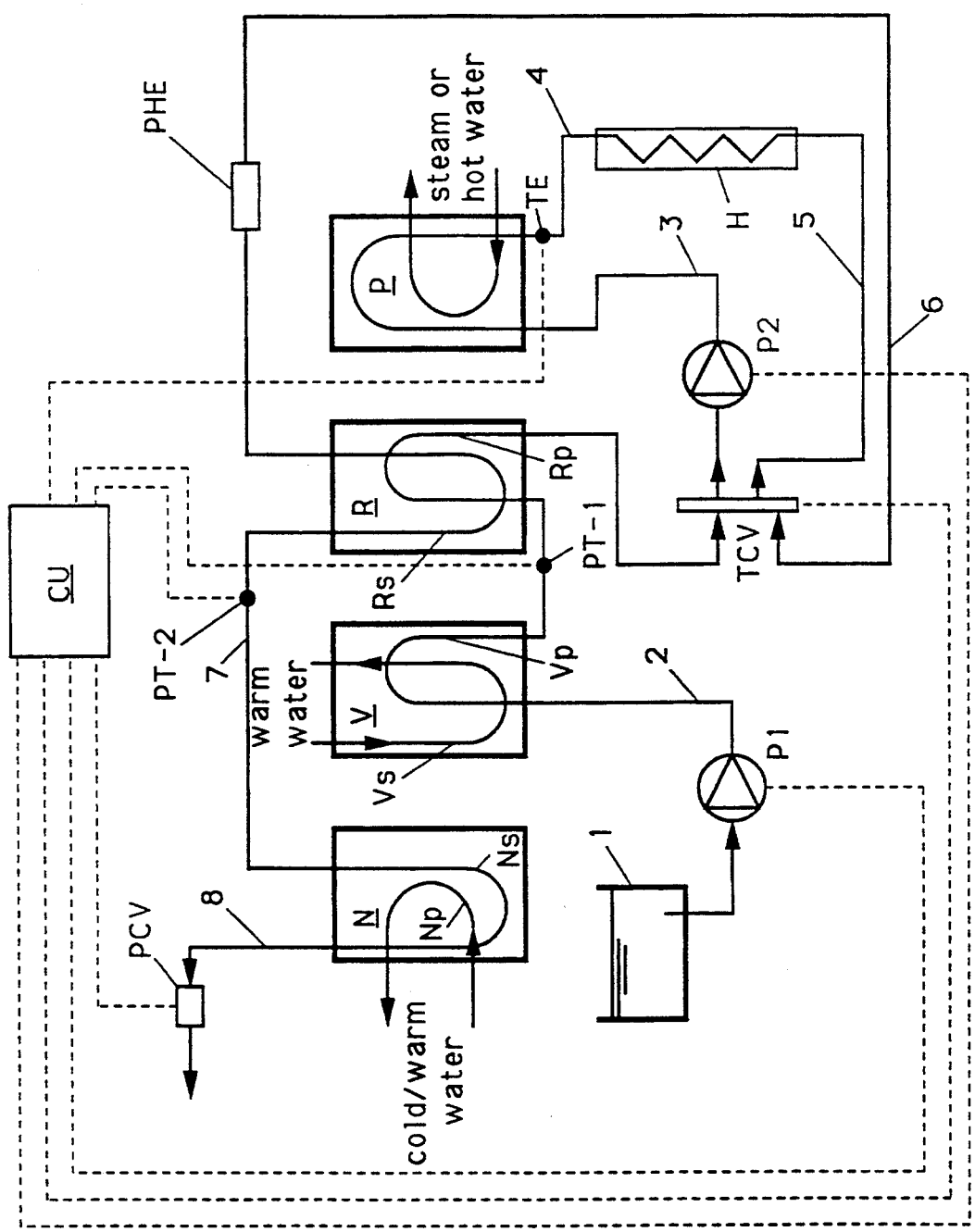

METHOD AND APPARATUS FOR HEAT TREATING A FLUID PRODUCT

This invention relates to a method for heat treating a fluid product, in which the product drawn from a supply is preheated in one or more stages by countercurrent heat exchange, brought up to the desired treatment temperature in a throughflow heat exchange process and subsequently maintained at the treatment temperature for a given time, and in which the product, as long as it has the proper treatment temperature, is discharged through pumping action for further processing after the countercurrent heat exchange stage wherein the heat of the treated product is at least partly used for preheating and wherein a positive pressure difference between the secondary and the primary countercurrent heat exchange sections is maintained through the pumping action referred to, whilst, if the temperature of the treated product proves to be too low, the treated product is recirculated in the final-temperature heating section through the pumping action referred to.

The invention further relates to an apparatus for carrying out the present method, this apparatus comprising a supply tank which, via the primary ducts of at least one preheating heat exchanger, to be referred to as regenerator, is connected, in succession, to a pump, a final-temperature heat exchanger, to be referred to as pasteurizer, a temperature maintaining element, and a multi-way valve, which are interconnected in series by means of pipes, a temperature sensor being provided between the pasteurizer and the multi-way valve, whilst the multi-way valve, in a first position, is in communication with the secondary duct of the preheating heat exchanger arranged directly upstream of the pasteurizer, and, in a second position, is in communication with the entrance of the pump.

U.S. Pat. No. 2,197,118 discloses such an apparatus for pasteurizing milk.

Because the pump is arranged between the preheating heat exchanger and the pasteurizer, the pressure in the pasteurizer, the temperature maintaining element and the secondary duct system of the preheating heat exchanger, all disposed on the delivery side of the pump, will be higher than in the primary duct system of the preheating heat exchanger disposed on the suction side. As a result, during normal operation of the apparatus, it is impossible for pasteurized milk to mix with non-pasteurized milk in the preheating heat exchanger, for instance in the event of leakage in the preheating heat exchanger. Further, because the multi-way valve is arranged downstream of the temperature maintaining element, it is impossible for any insufficiently heated milk to contaminate the secondary duct system of the preheat heat exchanger, since the insufficiently heated milk is recirculated directly through the final-temperature heating section.

In addition to the positive aspects described hereinabove, the known apparatus and the associated method have a number of disadvantages as well.

A first disadvantage is that the pump, being the only pump, serves both for drawing the product from the supply and for raising the pressure downstream of the pump. As a result, on the suction side of the pump, i.e., in the primary duct system of the preheating heat exchanger, a subatmospheric pressure prevails. As a consequence, leakage in the primary duct system is difficult to establish, since no milk will flow out. Since the resistance in the pasteurizer and the temperature maintaining element is rather high due to the length of the heat exchange ducts, the delivery pressure to be generated by the pump will have to be rather high. Owing to the great difference in pressure between the suction and the delivery sides of the pump, there is a substantial danger of cavitation in the pump. Cavitation is a phenomenon that can adversely affect the operation of the pump in a short time.

Another important disadvantage of the known apparatus is that no positive pressure difference prevails between the secondary and the primary duct system of the preheating heat exchanger when the milk is being recirculated through the final-temperature heating section owing to insufficient heating in the pasteurizer.

Yet another disadvantage of the known apparatus is that when the pressure difference between the primary and the secondary ducts of the preheating heat exchanger drops out, for instance as a result of a leak in the secondary duct of the preheating heat exchanger, the apparatus will continue to pasteurize normally, giving rise to the danger of as yet unpasteurized milk flowing into the secondary duct system of the preheating heat exchanger and mixing with the pasteurized milk coming from the pasteurizer. The known apparatus, therefore, involves the risk of unpasteurized milk being delivered unnoticed.

The object of the present invention is to provide a method for pasteurizing milk without the disadvantages described hereinabove.

To that end, according to the invention, a method of the type described in the opening paragraph hereof is characterized in that in the primary countercurrent heat exchanger section, a higher pressure than the atmospheric pressure is maintained through supply pump action, and, if the product is recirculated through the final-temperature heating section, the supply pump action is switched off and the secondary countercurrent heat exchange section is maintained at a higher pressure than the pressure in the primary countercurrent heat exchanger section, whilst, should the pressure difference between the primary and the secondary countercurrent heat exchanger sections drop out, the supply pump action is switched off, the product to be treated is recirculated through the final-temperature heating section and the discharge of the product is stopped.

Such a method offers the advantage that leakage in the primary countercurrent heat exchanger section can be readily established and that creating an overpressure in the secondary countercurrent heat exchanger section relative to the primary countercurrent heat exchanger section requires only relatively slight pumping action, since the supply of the product is already taken care of by the supply pump action and the pumping action need only generate a pressure difference of not more than about 0.5 bar. A further advantage of the method according to the invention is that, even in the case where the product to be treated is being recirculated through the final-temperature heating section, i.e., at too low a treatment temperature, the pressure in the secondary countercurrent heat exchange section is higher than the pressure in the corresponding primary section. In principle, this precludes treated product from being contaminated with the as yet untreated product, even during recirculation through the final-temperature heating section.

Should the pressure difference between the primary and secondary countercurrent heat exchanger sections drop out, the supply pump action will be switched off, the product present in the final-temperature heating section will be recirculated through this section and the discharge of the product will be stopped. This measure prevents the discharge for further processing of any as yet untreated material that has ended up in the secondary countercurrent heat exchange section, for instance as a result of a leak between the primary and secondary countercurrent heat exchange sections.

Moreover, this method offers the advantage that during recirculation of the treated product through the final-temperature heating section, there is no flow in the secondary or primary countercurrent heat exchange sections, so that the temperature equilibrium is maintained as much as possible.

In further elaboration of the method according to the invention, the product to be treated can be milk and the treatment temperature and the duration of the milk treatment can be chosen such that the milk is phosphatase-negative after treatment.

Milk so treated can be considered to be free of any pathogenic germs.

Another object of the invention is to provide an apparatus for heat treating a fluid product without the disadvantages described hereinabove.

To that end, according to the invention, an apparatus of the type described in the opening paragraph hereof is characterized by a second pump, to be referred to as product supply pump, which is arranged directly downstream of the supply tank, the apparatus further comprising means designed for maintaining a positive pressure difference between the secondary and primary ducts of the or each preheating heat exchanger, both in the first and in the second position of the multi-way valve.

Such an apparatus, which can be manufactured economically, offers the advantage that the pump can be a relatively small pump in that the supply of the product is already taken care of by the product supply pump. Because the pressure difference across the pump is relatively small, the danger of cavitation arising in the pump is reduced to a minimum.

Another advantage is that a positive pressure difference between the secondary and primary duct systems of the or each preheating heat exchanger is guaranteed both during normal treatment of the product, i.e., with sufficient heating in the pasteurizer, and during recirculation in the final-temperature heating section, i.e., with insufficient heating in the pasteurizer.

Still another advantage of an apparatus of the present design is that, in the event of recirculation, there is no flow in the primary and secondary duct systems of the or each preheating heat exchanger inasmuch as the material is recirculated through the pasteurizer and the temperature maintaining element. As a result, the temperature equilibrium in the preheating heat exchangers is substantially maintained even during recirculation. Accordingly, when the process is re-started, the entire apparatus can be rapidly brought up to the desired temperature.

In further elaboration of the apparatus according to the invention, the means referred to can be made of such design that, should the pressure difference between the secondary and primary ducts of the or each preheating heat exchanger drop out, the product supply pump is switched off, the discharge pipe is shut off and the multi-way valve is switched to the second position.

In the event of drop-out of the pressure difference between the secondary and primary ducts of the or each preheating heat exchanger, such an apparatus is prevented from further delivering any product from the secondary duct systems that may, through leakage, have been contaminated with as yet untreated product from the primary duct systems.

Further, in further elaboration of the apparatus according to the invention, the means referred to can be constituted by a pressure maintaining element arranged in the path leading from the multi-way valve to the discharge pipe and by pressure transmitters arranged in this path and in the path between the two pumps, a pressure control valve included in the discharge pipe of the apparatus, and at least one control unit designed for driving the multi-way valve, the pressure control valve and the two pumps, depending on the pressures measured by the pressure transmitters and the temperature measured by the temperature sensor.

Such an apparatus offers in a simple manner the possibility of varying the behavior of the apparatus by modifying the control behavior or the control unit.

A simple and inexpensive pressure maintaining element may for instance be a flexible, externally pressure-loaded compensator.

It is observed that German "Offenlegungsschrift" 40 25 570 discloses an apparatus for pasteurizing milk, comprising a second pump for maintaining a positive pressure difference between the primary and secondary duct systems of the preheating heat exchangers. In this known apparatus, however, there is no circulation through a final-temperature heating section. In the event of under-pasteurization, the product to be treated is discharged, for instance to the supply tank of the apparatus. It is clear that in the event of under-pasteurization, the fluid continues to flow in the primary and/or secondary duct systems of the preheating heat exchangers. As a result, the temperature equilibrium in these heat exchangers is lost upon recirculation and, as a consequence, the activation of the apparatus for normal use after recirculation will take more time. Moreover, the disturbance of the temperature equilibrium in the preheating heat exchangers results in a decrease in the temperature of the milk supplied to the pasteurizer. As a result, the pasteurizer must bridge a greater difference in temperature. In particular when returning to the normal operating condition, this can give rise to serious process control problems, which may have a strong adverse influence on the quality of the milk to be delivered.

BRIEF DESCRIPTION OF THE DRAWING

The FIGURE illustrates schematically the invention.

To further explain the present invention, one embodiment of the method and the apparatus will now be described, by way of example only, with reference to the accompanying drawings.

According to the drawing, the apparatus according to the invention comprises a supply tank 1 which, via a product supply pump P1, a pipe 2, and the primary ducts Vp and Rp of, respectively, a first preheating heat exchanger V, wherein steam or hot water can be utilized as heat emitting medium, and a second preheating heat exchanger R, to be referred to as regenerator, is connected, in succession, to a pressure raising pump P2, a final-temperature heat exchanger P, referred to as pasteurizer, wherein steam or hot water can be utilized as heat emitting medium, a temperature maintaining element H and a multi-way valve TCV, interconnected in series by means of pipes 3, 4 and 5. Arranged directly downstream of the pasteurizer P is a temperature sensor TE. In a first position, the multi-stage valve TCV is connected via a pipe 6, which includes a pressure maintaining element PHE, with the secondary duct Rs of the regenerator R arranged directly upstream of the pasteurizer P, and, in a second position, the valve TCV is connected with the entrance of the pump P2. The secondary duct Rs of the regenerator R is connected, in succession, to a pipe 7, the secondary ducts Ns of a cooling/post-heating heat exchanger N, with cold or warm water flowing through the primary ducts Np thereof, and a discharge pipe 8, which includes a pressure control valve PCV. In addition, the apparatus shown in the drawing comprises a first pressure transmitter PT-1 arranged in the pipe interconnecting the primary duct systems Vp, Rp of the preheating heat exchanger V and the regenerator R, respectively, and a second pressure transmitter PT-2, which is arranged in pipe 7 between the secondary duct systems Rs, Ns, of the regenerator R and the cooling/post-heating heat exchanger N, respectively.

The behavior of the apparatus is determined by a control unit CU, which drives the multi-way valve TCV, the pressure control valve PCV and the pumps P1 and P2, depending on the input signals generated by the temperature sensor TE and the pressure transmitters PT-1 and PT-2.

The apparatus operates as follows.

In normal operation, as yet unpasteurized milk is drawn from the supply tank 1 by the product pump P1 and, via pipe 2, successively directed through the primary ducts Vp and Rp of the preheating section V and the regenerator R, respectively, and, via the multi-way valve, with the pressure being raised by the pressure raising pump P2, via the pipe 3 through the pasteurizer P. From the pasteurizer P, the milk at pasteurization temperature flows via the pipe 4 through the temperature maintaining element H and via the pipe 5, the multi-way valve TCV via the pipe 6 to the secondary duct Rs of the regenerator R, whence the partially cooled milk flows via pipe 7 and the cooling/post-heating section N to the discharge pipe 8 for pasteurized milk, where the pressure control valve PCV provides a positive pressure difference between the pasteurized milk in the secondary duct system Rs and the as yet unpasteurized milk in the primary duct system Rp of the regenerator.

However, as soon as the temperature sensor TE at the exit of the pasteurizer senses too low a temperature, which indicates underpasteurization, or when the control unit establishes through pressure transmitters PT-1 and PT-2 that the pressure difference between the secondary and primary ducts of the regenerator R is failing and cannot be readjusted by means of pumps P1 and P2 and the pressure control valve PCV, then the multi-way valve TCV is driven, such that the pipe 6 running from this valve to the regenerator R is shut off and the pipe running from the temperature maintaining element H is short-circuited so as to be in communication with the entrance of the pressure raising pump P2, while at the same time the product pump P1 is switched off and the discharge pipe is shut off by means of the pressure control valve PCV.

The milk in the final-temperature heating section is then recirculated through the pressure raising pump P2, the pasteurizer P and the temperature maintaining element H, until the control unit registers a normal situation again after correction of the disturbance in the heat supply to the pasteurizer P or after correction of the disturbance causing the drop-out of the pressure difference between the primary and the secondary ducts of the preheating heat exchangers. Then, the normal operating condition is set again.

In the period when the underpasteurized milk is isolated in the final-temperature heating section (TCV/P2/3/P/4/H/5), there is no flow in the heat exchangers N, V and R, so that the normal temperature range is maintained therein. Further, the pressure maintaining element PHE in pipe 6 ensures that in the event of recirculation due to the product having too low a temperature at the exit of the pasteurizer, the pressure in the section formed by the pipes 6, 7 and 8 and the secondary ducts Rs and Ns of he regenerator R and the cooling/post-heating heat exchanger N, respectively, is higher than the pressure in the primary ducts thereof.

It will be clear that the invention is not limited to the embodiment described, but that various modifications are possible within the framework of the invention.

We claim:

1. A method for heat treating a fluid product, in which the product is drawn from a supply and preheated in one or more stages by countercurrent heat exchange, brought up to the desired treatment temperature in a throughflow heat exchange process and subsequently maintained at the treatment temperature for a given time, and in which the product, as long as it has the proper treatment temperature, is discharged through pumping action for further processing after the countercurrent heat exchange stage wherein the heat of the treated product is at least partly used for preheating and wherein a positive pressure difference between the secondary and the primary countercurrent heat exchange sections is maintained through said pumping action, if the temperature of the treated product is below said desired treatment temperature, the treated product is recirculated in the final-temperature heating section through said pumping action, and including the steps of maintaining in the primary countercurrent heat exchanger section, a higher pressure than the atmospheric pressure through supply pump action, switching off said supply pump action when the product is recirculated through the final-temperature heating section, maintaining said secondary countercurrent heat exchange section at a higher pressure than the pressure in said primary countercurrent heat exchanger section, switching off said supply pump action when the pressure difference between the primary and the secondary countercurrent heat exchanger sections drop out, recirculating the product to be treated through the final-temperature heating section and stopping the discharge of the product.

2. A method as claimed in claim 1, wherein the product to be treated is milk and the treatment temperature and the duration of the milk treatment are chosen such that the milk is phosphatase-negative after treatment.

3. In an apparatus for heat treating a fluid product and discharging said product via a discharge pipe, comprising a supply tank interconnected, by means of pipes, in the order named to the primary ducts of at least one preheating heat exchanger, to be referred to as regenerator, a first pump, a final-temperature heat exchanger, to be referred to as pasteurizer, a temperature maintaining element, and a multi-position valve, a temperature sensor arranged between the pasteurizer and the multi-position valve, said multi-position valve, in a first position, being in communication with the secondary duct of the preheating heat exchanger arranged upstream of the pasteurizer, and, in a second position, being in communication with the entrance of said first pump, said apparatus further including a second pump, to be referred to as product supply pump, arranged directly downstream of the supply tank, and means for maintaining a positive pressure difference between the secondary and primary ducts of each preheating heat exchanger, both in the first and in the second position of the multi-position valve and including means to switch off said product supply pump when said multi-position valve is in said second position.

4. An apparatus as claimed in claim 3, wherein said positive pressure difference maintaining means, when the pressure difference between the secondary and primary ducts of each preheating heat exchanger drops out, switches off the product supply pump shuts off the discharge pipe and switches the multi-position valve to the second position.

5. An apparatus as claimed in claim 3, wherein said positive pressure difference maintaining means includes a pressure maintaining element arranged in the path leading from the multi-position valve to the discharge pipe, pressure transmitters arranged in said path and in the path between said first and second pumps, a pressure control valve included in the discharge pipe of the apparatus, and at least one control unit for controlling the multi-position valve, said pressure control valve and said first and second pumps, depending on the pressures measured by said pressure transmitters and the temperature measured by said temperature sensor.

6. An apparatus as claimed in claim 5, within said pressure maintaining element is a flexible externally pressure-loaded compensator.

7. An apparatus as claimed in claim 4, wherein said positive pressure difference maintaining means includes a pressure maintaining element arranged in the path leading from said multi-position valve to the discharge pipe, pressure transmitters arranged in said path and in the path between said first and second pumps, a pressure control valve included in the discharge pipe of the apparatus, and at least one control unit for controlling the multi-position valve, the pressure control valve and said first and second pumps, depending on the pressures measured by said pressure transmitters and the temperature measured by said temperature sensor.

* * * * *